US012603715B2

(12) United States Patent
Min et al.

(10) Patent No.: US 12,603,715 B2
(45) Date of Patent: Apr. 14, 2026

(54) DEVICE AND METHOD FOR PROVIDING INFORMATION ABOUT COMMUNICATION STATE OF NETWORK IN ELECTRONIC DEVICE

(71) Applicant: SAMSUNG ELECTRONICS CO., LTD., Suwon-si (KR)

(72) Inventors: Hyunkee Min, Suwon-si (KR); Minsoo Kim, Suwon-si (KR); Jeongyong Myoung, Suwon-si (KR); Sunkee Lee, Suwon-si (KR)

(73) Assignee: Samsung Electronics, Ltd., Suwon-si (KR)

( * ) Notice: Subject to any disclaimer, the term of this patent is extended or adjusted under 35 U.S.C. 154(b) by 537 days.

(21) Appl. No.: 18/103,785

(22) Filed: Jan. 31, 2023

(65) Prior Publication Data

US 2023/0179503 A1 Jun. 8, 2023

Related U.S. Application Data

(63) Continuation of application No. PCT/KR2021/010084, filed on Aug. 2, 2021.

(30) Foreign Application Priority Data

Jul. 31, 2020 (KR) ........................ 10-2020-0096387

(51) Int. Cl.
*H04B 17/318* (2015.01)
*H04L 67/75* (2022.01)

(52) U.S. Cl.
CPC ........... *H04B 17/318* (2015.01); *H04L 67/75* (2022.05)

(58) Field of Classification Search
CPC ......... H04W 16/18–20; H04W 28/0231–0247; H04W 36/30–305; H04W 40/12–16;
(Continued)

(56) References Cited

U.S. PATENT DOCUMENTS 7,853,275 B2 12/2010 Ito
8,744,391 B2 * 6/2014 Tenbrook .............. H04W 48/16
455/226.2

(Continued)

FOREIGN PATENT DOCUMENTS

KR 10-0416751 1/2004
KR 2013-0039274 4/2013
(Continued)

OTHER PUBLICATIONS

[Online], Mark Wickham, "Connectivity", Chapter 2, Practical Android, http://doi.org/10.1007/978-1-4842-3333-7 2, 30 pages.
(Continued)

*Primary Examiner* — Brendan Y Higa
(74) *Attorney, Agent, or Firm* — Nixon & Vanderhye P.C.

(57) ABSTRACT

According to various embodiments of the present disclosure, an electronic device comprises: a display, a communication circuit, and a memory which stores commands, wherein the communication circuit is configured to: transmit a designated packet to an external electronic device through a designated network; receive feedback information, including the strength of a signal received from the electronic device, from the external electronic device in response to the transmission of the designated packet; determine the communication state of the designated network based on the received feedback information; and display, on the display, an indicator indicating the communication state based on the determined communication state of the designated network.

18 Claims, 13 Drawing Sheets

(58) Field of Classification Search
  CPC .......... H04L 67/75; H04B 17/309–364; H04B
                                17/318; H04B 17/328
  See application file for complete search history.

(56)                        References Cited

U.S. PATENT DOCUMENTS

|  9,148,810 | B2 |  9/2015 | Kim |
|  9,288,297 | B2 |  3/2016 | Masri |
| 10,158,413 | B2 | 12/2018 | Moon et al. |
| 10,454,538 | B2 * | 10/2019 | Vermani ............... H04L 5/0035 |
| 2008/0159133 | A1 |  7/2008 | Yeung et al. |
| 2010/0260060 | A1 * | 10/2010 | Abraham .............. H04W 28/18 |
| | | | 370/252 |
| 2015/0350933 | A1 * | 12/2015 | Mannemala .......... H04W 76/18 |
| | | | 370/225 |
| 2016/0165475 | A1 |  6/2016 | Kim et al. |
| 2017/0019837 | A1 * |  1/2017 | Katar ............... H04W 36/0094 |
| 2017/0273058 | A1 |  9/2017 | Agiwal et al. |
| 2018/0084472 | A1 * |  3/2018 | Cariou .............. H04W 36/0058 |
| 2018/0321366 | A1 | 11/2018 | Okubo et al. |
| 2018/0331749 | A1 | 11/2018 | Ghosh |
| 2019/0014021 | A1 * |  1/2019 | Huang .................. H04W 48/18 |
| 2019/0069208 | A1 * |  2/2019 | Pefkianakis .......... H04W 84/12 |
| 2019/0081664 | A1 |  3/2019 | Vermani et al. |
| 2019/0341988 | A1 | 11/2019 | Schelstraete et al. |
| 2020/0374810 | A1 * | 11/2020 | Hart .................... H04W 52/343 |

FOREIGN PATENT DOCUMENTS

| KR | 2017-0092566 | 8/2017 |
| KR | 2018-0115345 | 10/2018 |
| KR | 2020-0051607 | 5/2020 |

OTHER PUBLICATIONS

International Search Report for PCT/KR2021/010084 dated Nov. 29, 2021, 7 pages.
Written Opinion of the ISA for PCT/KR2021/010084 dated Nov. 29, 2021, 4 pages.
Korean Office Action issued Jul. 4, 2025 in corresponding Korean Patent Application No. 10-2020-0096387.
Korean Notice of Patent Grant dated Dec. 24, 2025 for KR Application No. 10-2020-0096387.

* cited by examiner 1210  1220

1210  1220

1

DEVICE AND METHOD FOR PROVIDING INFORMATION ABOUT COMMUNICATION STATE OF NETWORK IN ELECTRONIC DEVICE

CROSS-REFERENCE TO RELATED APPLICATIONS

This application is a continuation of International Application No. PCT/KR2021/010084 designating the United States, filed on Aug. 2, 2021, in the Korean Intellectual Property Receiving Office and claiming priority to Korean Patent Application No. 10-2020-0096387, filed on Jul. 31, 2020, in the Korean Intellectual Property Receiving Office, the disclosures of which are incorporated by reference herein in their entireties.

BACKGROUND

Field

The disclosure relates to an apparatus and a method for providing a communication state of a network with an external electronic device by an electronic device.

Description of Related Art

An electronic device may be connected to an external electronic device, such as an access point (AP), through a network like a Wi-Fi system, to access the Internet. The electronic device may measure received signal strength indication (RSSI) values of signals received from the external electronic device and display indicators indicating reception sensitivity on a display of the electronic device according to the measured RSSI values.

Meanwhile, a multi-input multi-output (MIMO) scheme is defined in IEEE 802.11n, IEEE 802.11ac, and IEEE 802.11ax standards, and when the MIMO scheme is used, a transmission side may support a Tx beamforming scheme for obtaining a Tx diversity gain by performing precoding for channel state information (CSI) on the basis of the CSI. For example, a beamformer may transmit a null data packet (NDP) to a beamformee, and the beamformee receiving the NDP may transmit a CSI feedback packet to the beamformer.

An electronic device may have a relatively small number of antennas for transmission and reception and lower transmission power compared to an external electronic device such as an access point (AP). Accordingly, the strength of a signal which the external electronic device receives from the electronic device may be less than the strength of a signal which the electronic device receives from the external electronic device. For example, when the electronic device and the external electronic device are in a line of sight (LOS) environment, the strength of the signal received by the electronic device may be −65 dBm and the strength of the signal received by the external electronic device may be −70 dBm which is lower than the strength of −65 dBm.

Further, a distance between the electronic device and the external electronic device such as the access point (AP) is long or each device is in a non-line of sight (NLOS) environment, a difference between the strengths of transmitted and received signals of the respective devices may further increase. For example, when the electronic device and the external electronic device are in the line of sight (LOS) environment, the strength of the signal received by the electronic device may be −65 dBm and the strength of the signal received by the external electronic device may be −85 dBm.

Since an RSSI indication supported by the electronic device reflects only the strength of the signal received by the electronic device, the RSSI indication may not reflect the real communication environment if the strength of the signal which the electronic device transmits and the external electronic device receives is less than the strength of the signal received by the electronic device.

SUMMARY

Embodiments of the disclosure provide a device and method in which an RSSI indication method reflecting the real communication environment and an apparatus therefor may be provided.

An electronic device according to various example embodiments may include: a display, a communication circuit, and a memory including instructions, wherein the communication circuit may be configured to: transmit a specified packet to an external electronic device through a specified network, receive feedback information including a strength of a signal received from the electronic device from the external electronic device in response to transmission of the specified packet, determine a communication state of the specified network based on the received feedback information, wherein the electronic device is configured to control the display to display an indicator indicating the communication state on the display based on the determined communication state of the specified network.

A method of operating an electronic device according to various example embodiments may include: transmitting a specified packet to an external electronic device through a specified network, receiving feedback information including a strength of a signal received from the electronic device from the external electronic device in response to transmission of the specified packet, determining a communication state of the specified network based on the received feedback information, and displaying an indicator indicating the communication state on the display based on the determined communication state of the specified network.

An electronic device according to various example embodiments may include: a display, a communication circuit, a memory including instructions, and at least one processor electrically connected to the display, the communication circuit, and the memory, wherein the at least one processor may be configured to: identify a Wi-Fi connection state with an external electronic device supporting channel state information (CSI) feedback, based on the Wi-Fi connection state with the external electronic device being identified, identify a first received signal strength indication (RSSI) indicating a signal strength based on the electronic device receiving a signal from the external electronic device, control the communication circuit to transmit a null data packet (NDP) to the external electronic device based on the first RSSI is less than a first threshold value, acquire CSI feedback from the external electronic device, acquire a second RSSI based on the acquired CSI feedback, and control the display to display an indicator indicating the Wi-Fi connection state based on a lower value among the first RSSI or the second RSSI on the display based on a difference between the first RSSI and the second RSSI being greater than a second threshold value.

When transmission and reception between an electronic device and an external electronic device are performed through a network, an RSSI indication reflecting a real communication environment may be provided in consideration of not only the strength of a signal received by the electronic device but also the strength of a signal transmitted by the electronic device.

Further, when an environment having difficulty in performing communication due to the low strength of the signal transmitted by the electronic device is determined, roaming trigger may be performed or information on a communication situation may be provided to the user.

In addition, various effects directly or indirectly detected through the disclosure can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with description of drawings, the same or similar reference numerals may be used for the same or similar elements.

DETAILED DESCRIPTION

Hereinafter, various example embodiments of the present disclosure will be described with reference to the accompanying drawings. However, this does not limit the disclosure to specific embodiments, and it should be understood that various modifications, equivalents, and/or alternatives of embodiments of the disclosure are included.

Figure 1:
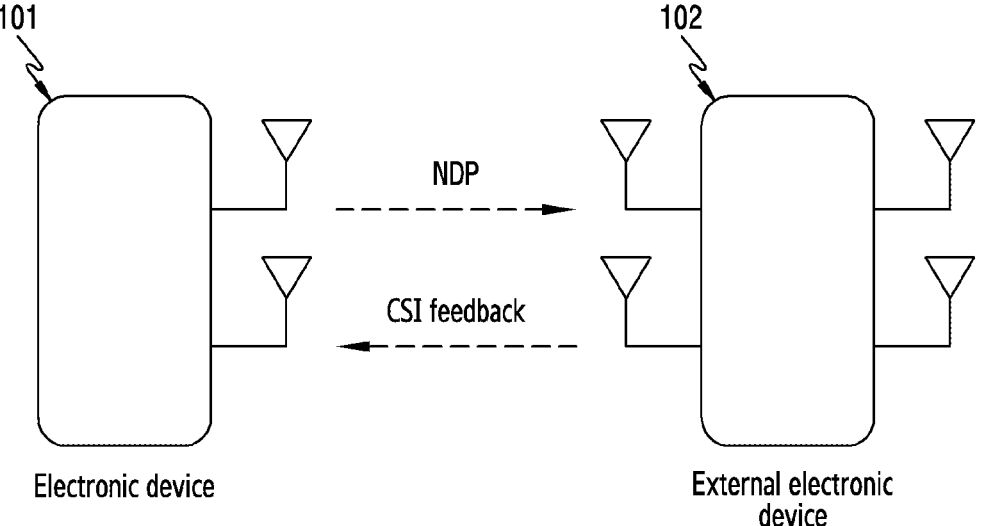
FIG. 1 is a diagram illustrating an electronic device and an external electronic device transmitting and receiving signals through a network according to various embodiments.

FIG. 1 is a diagram illustrating an example electronic device 101 and an external electronic device 102 transmitting and receiving signals according to various embodiments.

In an embodiment, the external electronic device 102 may be an access point (AP). For example, the external electronic device 102 may be WLAN equipment capable of performing transmission and reception with the electronic device 101 through Wi-Fi.

Referring to FIG. 1, the electronic device 101 may transmit a null data packet (NDP) to the external electronic device 102, and the external electronic device 102 receiving the NDP may transmit a channel state information (CSI) feedback packet to the electronic device 101.

According to an embodiment, when making a connection with the external electronic device 102, the electronic device 101 supporting the Wi-Fi standard such as IEEE 802.11n, IEEE 802.11ac, or 802.11ax may identify whether the external electronic device 102 supports the IEEE 802.11n, IEEE 802.11ac, or IEEE 802.11ax standard, a multi-input multi-output (MIMO) function, and an explicit beamforming scheme. For example, in the IEEE 802.11n standard, there is a Transmit Beamforming Capabilities field within an HT capabilities element, and it may be identified whether transmit beamforming is supported and the explicit CSI feedback function is supported in the field. In another example, in the IEEE 802.11ac and IEEE 802.11ax standards, it is whether a beamformer function is supported and a beamformee function is supported may be included, and when the beamformee function is supported, it is defined to support the explicit CSI feedback function.

According to an embodiment, when making the connection with the external electronic device 102 based on the IEEE 802.11n, IEEE 802.11ac, or IEEE 802.11ax standard, the electronic device 101 may identify whether the external electronic device 102 support the explicit CSI feedback function. When the external electronic device 102 supports the explicit CSI feedback function, the electronic device 101 may transmit NDP announcement and/or NDP frame to the external electronic device 102. The external electronic device 102 receiving the NDP announcement and/or the NDP frame from the electronic device 101 may return CSI feedback. The external electronic device 102 may carry the CSI feedback on an action frame or an action no ack frame. The action frame or the action no ack frame may include a compressed or a non-compressed beamforming frame body, and the frame body may include a beamforming report field. The beamforming report field may include an SNR for each of a plurality of streams and a beamforming feedback matrix value for each stream.

Various embodiments of the disclosure are described based on NDP/NDPA and the CSI feedback packet in a Wi-Fi network for convenience of description, but the content of the disclosure may be applied to an embodiment in which a network environment of a predetermined (e.g., specified) network is guided using a predetermined (e.g., specified) transmission packet and a predetermined feedback packet in the predetermined network.

Figure 2:
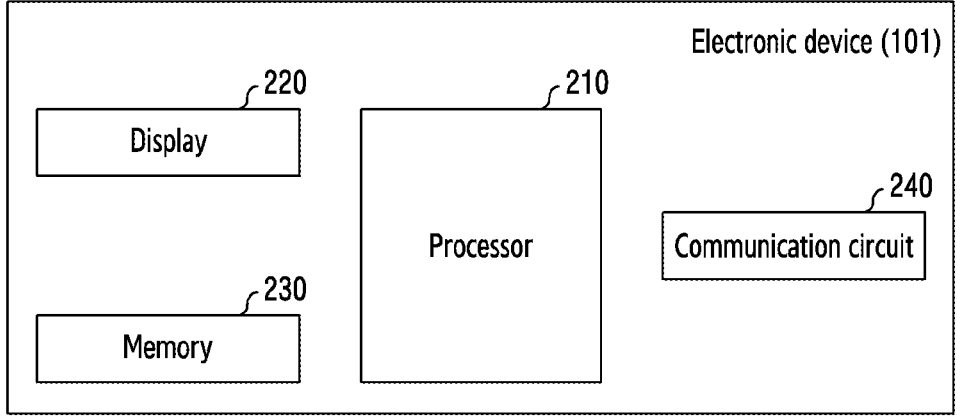
FIG. 2 is a block diagram illustrating an example configuration of the electronic device according to various embodiments.

FIG. 2 is a block diagram illustrating an example configuration of the electronic device 101 according to various embodiments.

Referring to FIG. 2, the electronic device 101 may include a processor (e.g., including processing circuitry) 210, a display 220, a memory 230, and a communication circuit 240.

In an embodiment, the processor 210 may include various processing circuitry and be electrically connected to the display 220, the memory 230, and the communication circuit 240.

In an embodiment, when the communication circuit 240 detects a network communication state, the processor 210 electrically connected to the communication circuit 240 may display an indicator indicating a communication state of a predetermined network on the display 220 electrically connected to the processor 210 when instructions stored in the electrically connected memory 230 are executed. When the network connection state between the electronic device 101 and the external electronic device 102 is good, the processor 210 may display a shape corresponding to a fully charged antenna bar on the display 220 as the indicator. In another example, the indicator may be expressed in other shapes showing the number as well as the antenna bar shape.

Figure 3:
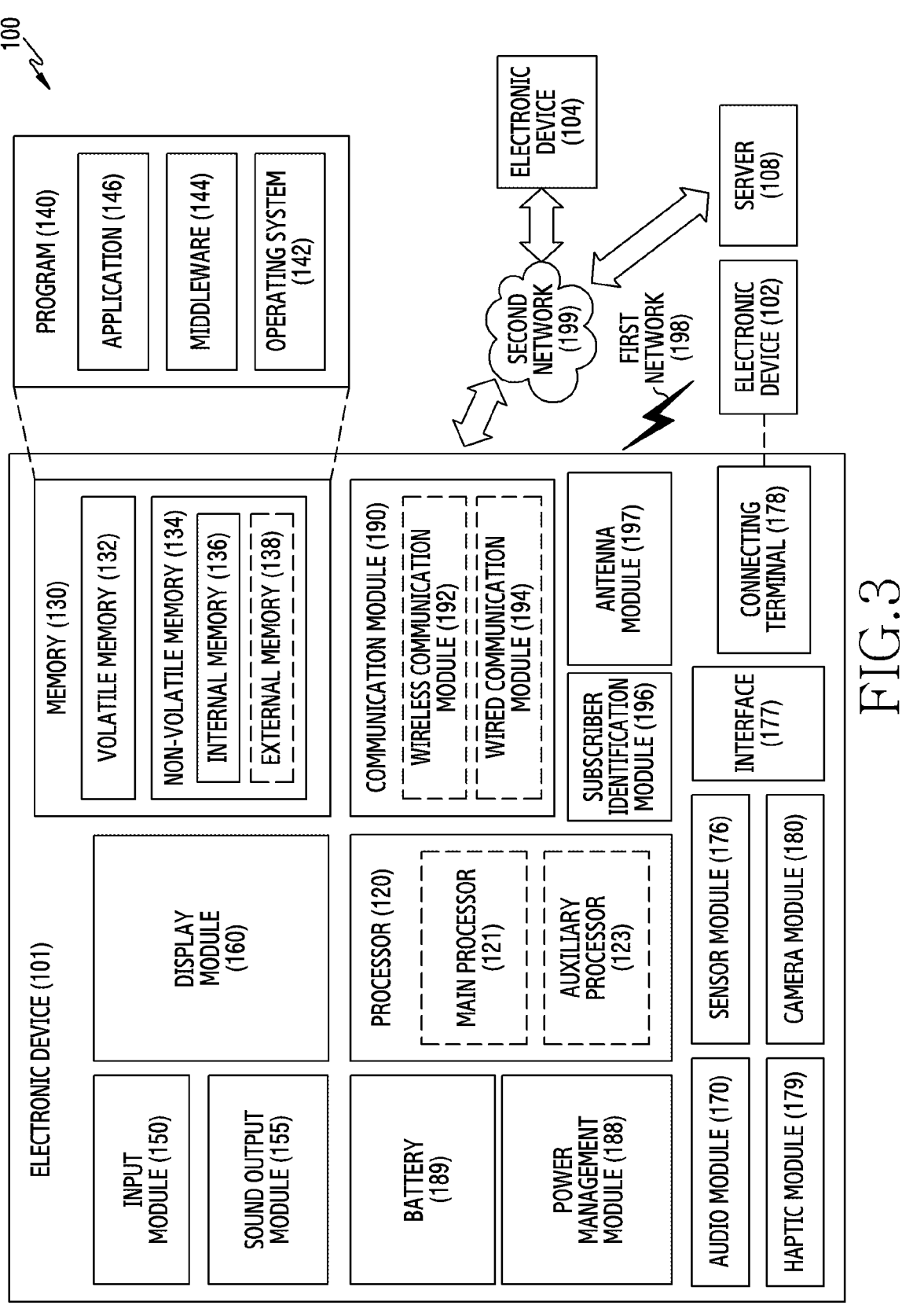
FIG. 3 is a block diagram illustrating the electronic device within a network environment according to various embodiments.

FIG. 3 is a block diagram illustrating an example electronic device 101 in a network environment 100 according to various embodiments.

Referring to FIG. 3, the electronic device 101 (e.g., the electronic device 101 of FIGS. 1A and 1B) in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120 (e.g., the processor 210 of FIG. 2), memory 130 (e.g., the memory 230 of FIG. 2), an input module 150, a sound output module 155, a display module 160 (e.g., the display 220 of FIG. 2), an audio module 170, a sensor module 176, an interface 177, a connecting terminal 178, a haptic module 179, a camera module 180, a power management module 188, a battery 189, a communication module 190 (e.g., the communication circuit 240 of FIG. 2), a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 (e.g., the processor 210 of FIG. 2) may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 (e.g., the memory 230 of FIG. 2) may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 (e.g., the display 220 of FIG. 2) may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 (e.g., the communication circuit 240 of FIG. 2) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 4:
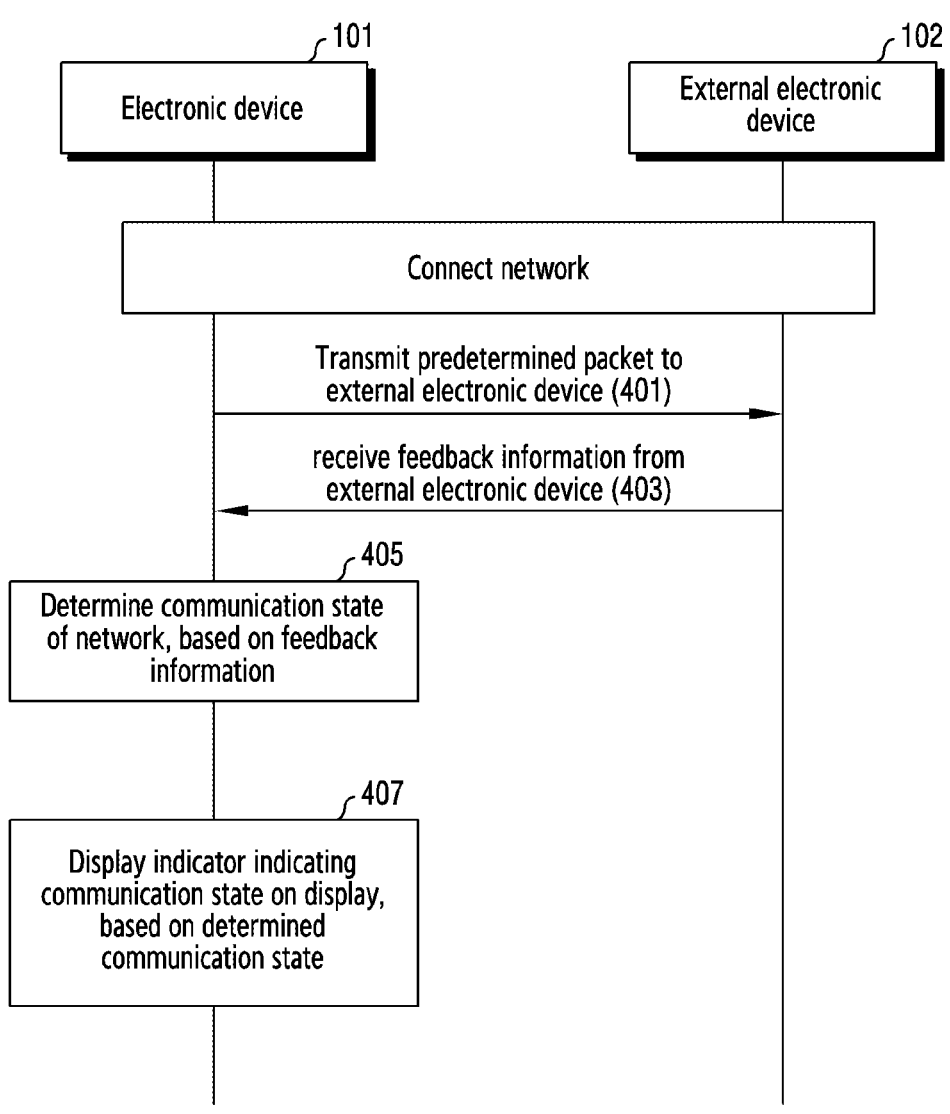
FIG. 4 is a signal flow diagram illustrating an example operation of the electronic device and the external electronic device connected through the network according to various embodiments.

FIG. 4 is a signal flow diagram illustrating an example operation of the electronic device 101 and the external electronic device 102 connected through the network according to various embodiments.

Referring to FIG. 4, the electronic device 101 may be connected to the external electronic device 102 through the network. In an embodiment, the electronic device 101 and the external electronic device 102 may be connected through the Wi-Fi network.

According to an embodiment, the electronic device 101 may transmit a predetermined packet to the external electronic device 102 in operation 401. In an embodiment, the predetermined packet transmitted by the electronic device 101 may be a null data packet (NDP).

According to an embodiment, the electronic device 101 may receive feedback information which the external electronic device 102 transmits in response to the predetermined packet received from the electronic device 101 in operation 403. In an embodiment, the feedback information received by the electronic device 101 may be channel state information (CSI) feedback information.

According to an embodiment, the electronic device 101 may determine a communication state of a predetermined network based on the feedback information received from the external electronic device 102 in operation 405. In an embodiment, the electronic device 101 may determine a Wi-Fi communication state based on the CSI feedback information received from the external electronic device 102.

According to an embodiment, the electronic device 101 may display an indicator indicating a communication state on the display 220 based on the determined communication state of the predetermined network in operation 407. For example, when the electronic device 101 determines that the Wi-Fi communication state is good on the basis of the CSI feedback information received from the external electronic device 102, the electronic device 101 may display an indicator indicating the good communication state on the display 220 on the basis of the good Wi-Fi communication state.

Figure 5:
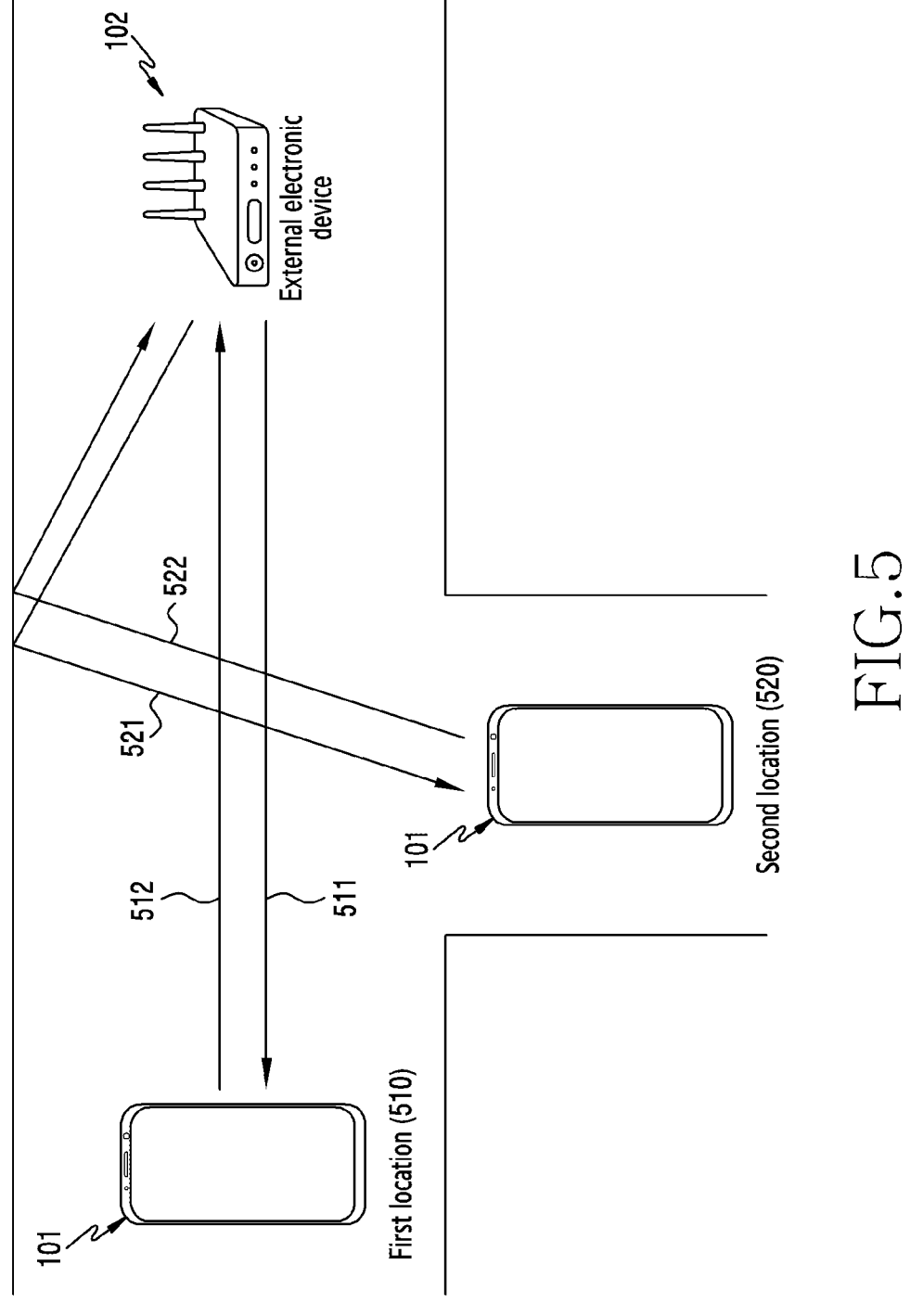
FIG. 5 is a diagram illustrating the electronic device and the external electronic device in a LOS or NLOS environment according to various embodiments.

FIG. 5 is a diagram illustrating the electronic device 101 and the external electronic device 102 in a line of sight (LOS) environment or a non-line-of-sight (NLOS) environment according to various embodiments.

In an embodiment, the strength of a signal which the electronic device 101 receives from the external electronic device 102 according to an environment (for example, the location) in which the electronic device 101 communicates with the external electronic device 102 may be different from the strength of a signal which the electronic device 101 transmits and the external electronic device 102 receives. Further, a network state which the electronic device 101 determines based on the received signal may be different from a network state which the external electronic device 102 determines on the basis of a signal received from the electronic device 101.

Referring to FIG. 5, the electronic device 101 may be in a line of sight (LOS) environment with the external electronic device 102 when the electronic device 101 is in a first location 510, and may be in a non-line of sight (NLOS) environment with the external electronic device 102 when the electronic device 101 is in a second location 520.

In an embodiment, when the electronic device 101 is positioned in the first location 510, the strength of a signal 512 which the external electronic device 102 receives from the electronic device 101 may have no difference from the strength of a signal 511 which the electronic device 101 receives from the external electronic device 102. For example, there may be no significant difference between a transmission state and a reception state of the electronic device 101 for the external electronic device 102.

In an embodiment, when the electronic device 101 is positioned in the second location 520, the strength of a signal 522 which the external electronic device 102 receives from the electronic device 101 may be less than the strength of a signal 521 which the electronic device 101 receives from the external electronic device 102. The electronic device 101 according to various embodiments may receive information on the strength of the signal transmitted by the electronic device 101 from the external electronic device 102 as feedback and determine a network state on the basis of the received feedback.

Although not illustrated, a path of a signal which the electronic device 101 receives from the external electronic device 102 may be different from a path of a signal which the electronic device 101 receives from the external electronic device 102, and the strength of the signal may be different depending on the reception path. Further, the strength of the signal may be different depending on difference between the number of antennas used by the electronic device 101 to transmit a signal and the number of antennas used by the external electronic device 102 to transmit a signal.

Figure 6:
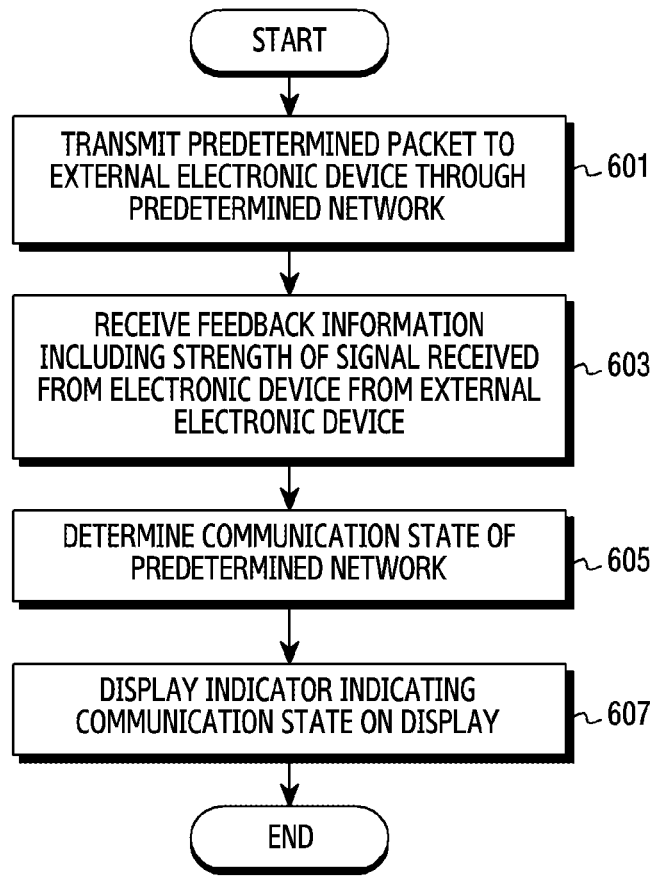
FIG. 6 is a flowchart illustrating an example operation of the electronic device according to various embodiments.

FIG. 6 is a flowchart illustrating an example operation of the electronic device 101 according to various embodiments.

Referring to FIG. 6, the electronic device 101 may determine a communication state of a predetermined network through feedback with the external electronic device 102 connected through the predetermined network and display an indicator indicating the determined communication state on the display 220.

According to an embodiment, the electronic device 101 may transmit a predetermined packet to the external electronic device 102 through the predetermined network in operation 601. In an example, the predetermined network may include a Wi-Fi network. In an embodiment, the predetermined packet may include a null data packet (NDP).

According to an embodiment, the electronic device 101 may receive feedback information including the strength of a signal, received from the electronic device 101, from the external electronic device 102 in operation 603.

According to an embodiment, the electronic device 101 may determine a communication state of a predetermined network based on the feedback information received from the external electronic device 102 in operation 605.

According to an embodiment, the electronic device 101 may display an indicator indicating the determined communication state of the network on the display 220 in operation 607.

Figure 7:
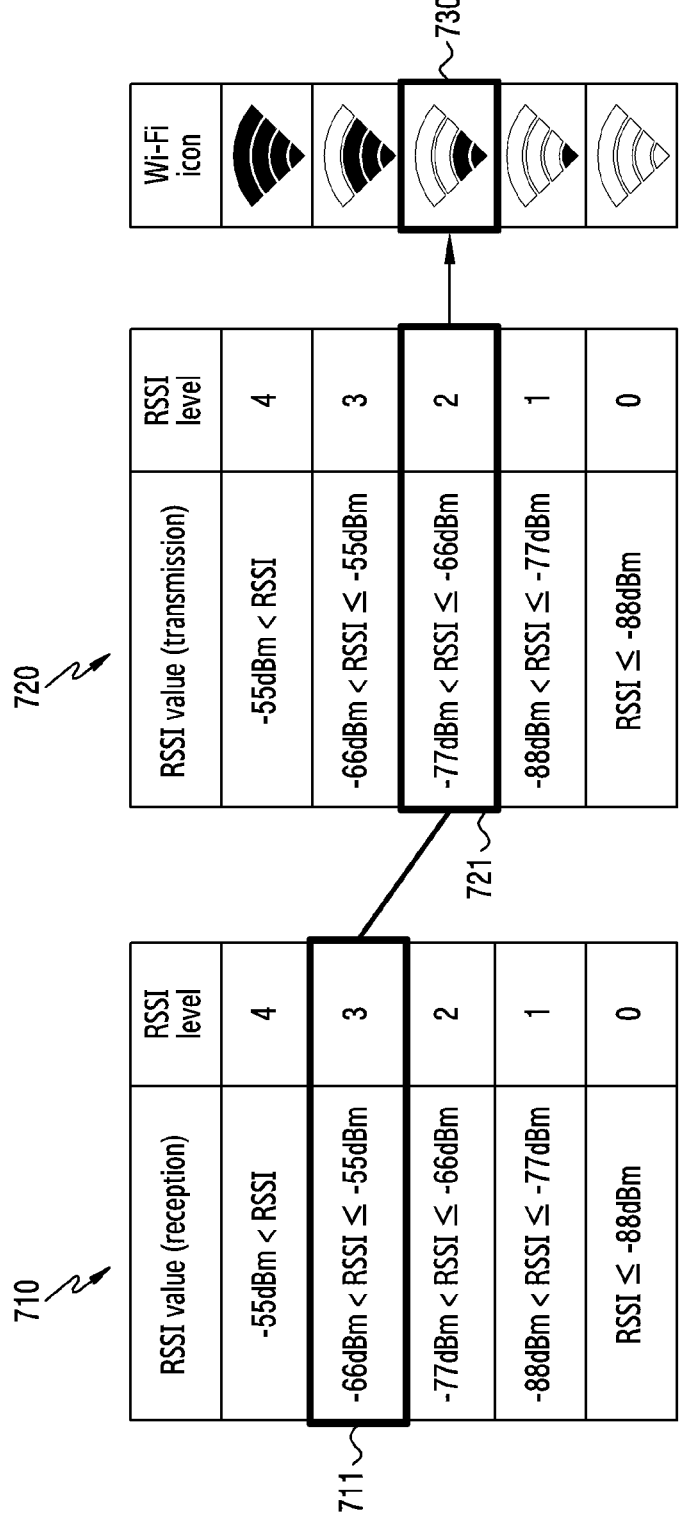
FIG. 7 is a diagram illustrating an example indicator displayed in consideration of a strength of a signal received by the electronic device and a strength of a transmitted signal according to various embodiments.

FIG. 7 is a diagram illustrating an example indicator displayed in consideration of the strength of a signal received by the electronic device 101 and the strength of a transmitted signal according to various embodiments.

Referring to FIG. 7, the electronic device 101 may acquire information on an indicator displayed on the display 220 in consideration of a table 710 showing the strength of a signal received by the electronic device 101 and a table 720 showing the strength of a signal received by the external electronic device 102.

In an embodiment, an RSSI value of the signal which the external electronic device 101 receives from the external electronic device 102 and an RSSI level corresponding thereto may be greater than an RSSI value of the signal which the external electronic device 102 receives from the electronic device 101 and an RSSI level corresponding thereto. For example, the strength of the signal received by the electronic device 101 may have an RSSI value in a range from −66 dBm to −55 dBm and an RSSI level of 3 as indicated by reference numeral 711, but the strength f the signal which the external electronic device 102 receives from the electronic device 101 may have an RSSI value from −77 dBm to −66 dBm and an RSSI level of 2 as indicated by reference numeral 721.

Figure 8:
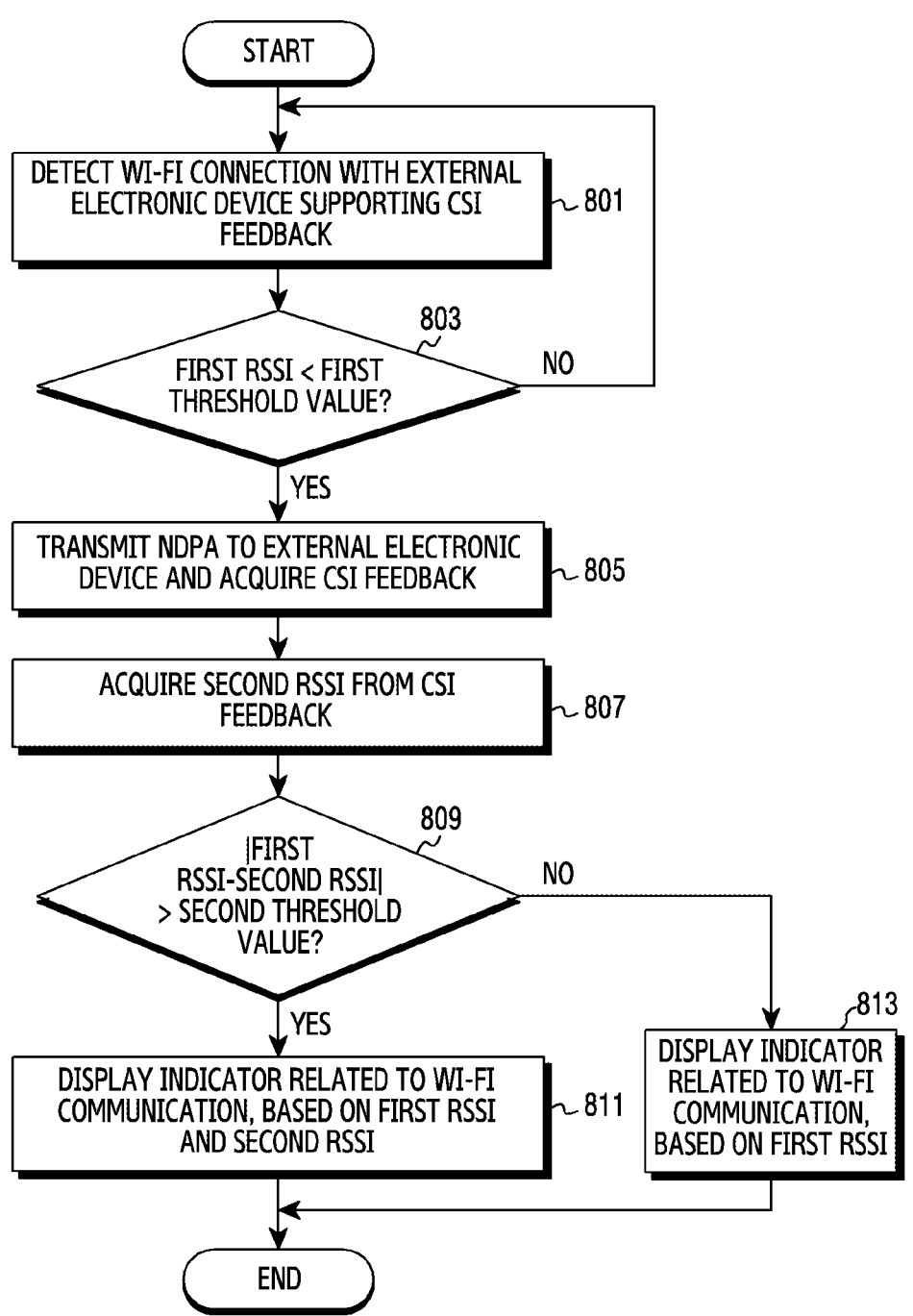
FIG. 8 is a flowchart illustrating an example operation in which the electronic device displays a Wi-Fi icon according to various embodiments.

In an embodiment, the electronic device 101 may display an indicator on the display 220 based on a lower value among the strength of the signal received by the electronic device 101 and the strength of the signal which the external electronic device 102 receives from the electronic device 101. For example, when the strength of the signal received by the electronic device 101 has an RSSI value in a range from −66 dBm to −55 dBm and an RSSI level of 3 as indicated by reference numeral 711 and the strength of the signal which the external electronic device 102 receives from the electronic device 101 has an RSSI value in a range from −77 dBm to −66 dBm and an RSSI level of 2 as indicated by reference numeral 721, a state 730 indicating two bars of the Wi-Fi icon may be displayed on the display 220 based on the strength of the signal which the external electronic device 102 receives from the electronic device 101 corresponding to the lower value. For example, when the strength of the signal received by the electronic device 101 has an RSSI value in a range from −66 dBm to −55 dBm and an RSSI level of 3 and the strength of the signal which the external electronic device 102 receives from the electronic device 101 has an RSSI value in a range from −88 dBm to −77 dBm and an RSSI level of 1, a state indicating two bars of the Wi-Fi icon may be displayed on the display 220 on the basis of the average of the strength of the signal received by the electronic device 101 and the strength of the signal which the external electronic device 102 receives from the electronic device 101. FIG. 8 is a flowchart illustrating the operation in which an electronic device (for example, the electronic device 101 of FIG. 1) displays a Wi-Fi icon according to an embodiment.

Hereinafter, information related to the strength of the signal which the electronic device 101 receives from the external electronic device 102 is described as a first RSSI, and information related to the strength of the signal which the external electronic device 102 receives from the electronic device 101 is described as a second RSSI.

Referring to FIG. 8, the electronic device 101 may change the number of antenna bars of the Wi-Fi icon based on the difference between the first RSSI related to the reception signal of the electronic device 101 and the second RSSI related to the reception signal of the external electronic device 102 acquired through CSI feedback information received from the external electronic device 102.

According to an embodiment, the electronic device 101 may detect the Wi-Fi connection with the external electronic device 102 (for example, the AP) supporting CSI feedback in operation 801. According to an embodiment, the electronic device 101 may identify whether the external electronic device 102 is a device supporting CSI feedback in HT, VHT, or HE capabilities element during management frame exchange such as a beacon, a probe response, or an association response received from the external electronic device 102. In an example, when the external electronic device 102 is a device which does not support CSI feedback, the electronic device 101 may not perform the operation after operation 803.

According to an embodiment, the electronic device 101 may determine whether the first RSSI related to the strength of the signal received by the electronic device 101 is less than a first threshold value in operation 803. For example, it may be determined whether a value obtained by converting the strength of the signal which the electronic device 101 of FIG. 1 receives from the external electronic device 102 into the RSSI is less than the first threshold value. For example, the first threshold value may be a comparison value for determining whether the signal strength is weak (for example, weak electric field) and may include the case in which the RSSI level is equal to or less than 2 with reference to FIG. 7. In another example, when the first RSSI and the second RSSI are asymmetric (for example, the received signal strength of the electronic device 101 is greater than the received signal strength of the external electronic device 102 by a predetermined value or more), the first threshold value may be a reference for determining that there is difficulty in data transmission and reception between the electronic device 101 and the external electronic device 102.

According to an embodiment, when the first RSSI is less than the first threshold value, the electronic device 101 may transmit at least one of a null data packet (NDP) or a null data packet announcement (NDPA) to the external electronic device 102 to acquire channel state information (CSI) feedback in operation 805. In an embodiment, when the first RSSI is greater than or equal to the first threshold value, the electronic device 101 may detect the Wi-Fi connection with the external electronic device 102 supporting CSI feedback in operation 801. For example, when operation 801 is periodically performed or when a predetermined event (for example, data communication is made or movement of the electronic device 101 is performed), the electronic device 101 may perform operation 801.

According to an embodiment, the electronic device 101 may acquire the second RSSI from the CSI feedback received from the external electronic device 102 in operation 807. For example, the electronic device 101 of FIG. 1 may acquire the second RSSI obtained by converting the strength of the signal which the external electronic device 102 receives from the electronic device 101 into the RSSI value based on the CSI feedback received from the external electronic device 102.

According to an embodiment, the electronic device 101 may determine whether difference between the first RSSI and the second RSSI is greater than a second threshold value in operation 809. In an example, the electronic device 101 may determine whether the difference between the first RSSI obtained by converting the strength of the signal received from the external electronic device 102 into the RSSI value and the second RSSI obtained by converting the strength of the signal which the external electronic device 102 receives from the electronic device 101 into the RSSI value is greater than the second threshold value. For example, the difference between the first RSSI and the second RSSI, which is greater than the second threshold value, may include an asymmetric state of the received signal strength of the electronic device 101 and the external electronic device 102.

According to an embodiment, when the difference between the first RSSI and the second RSSI is greater than the second threshold value, the electronic device 101 may display an indicator related to Wi-Fi communication based on the first RSSI and the second RSSI in operation 811. For example, a lower value based on the first RSSI and the second RSSI may be reflected to change the number of antenna bars of the Wi-Fi icon.

According to an embodiment, when the difference between the first RSSI and the second RSSI is less than the second threshold value, the electronic device 101 may display an indicator related to Wi-Fi communication based on the first RSSI in operation 813. For example, a lower value based on the first RSSI may be reflected to change the number of antenna bars of the Wi-Fi icon.

Although not illustrated, according to an embodiment, when the difference between the first RSSI and the second RSSI is less than the second threshold value, the electronic device 101 may perform operation 805 periodically or if a predetermined event (for example, data communication is made or movement of the electronic device 101 is performed) is detected.

Figure 9:
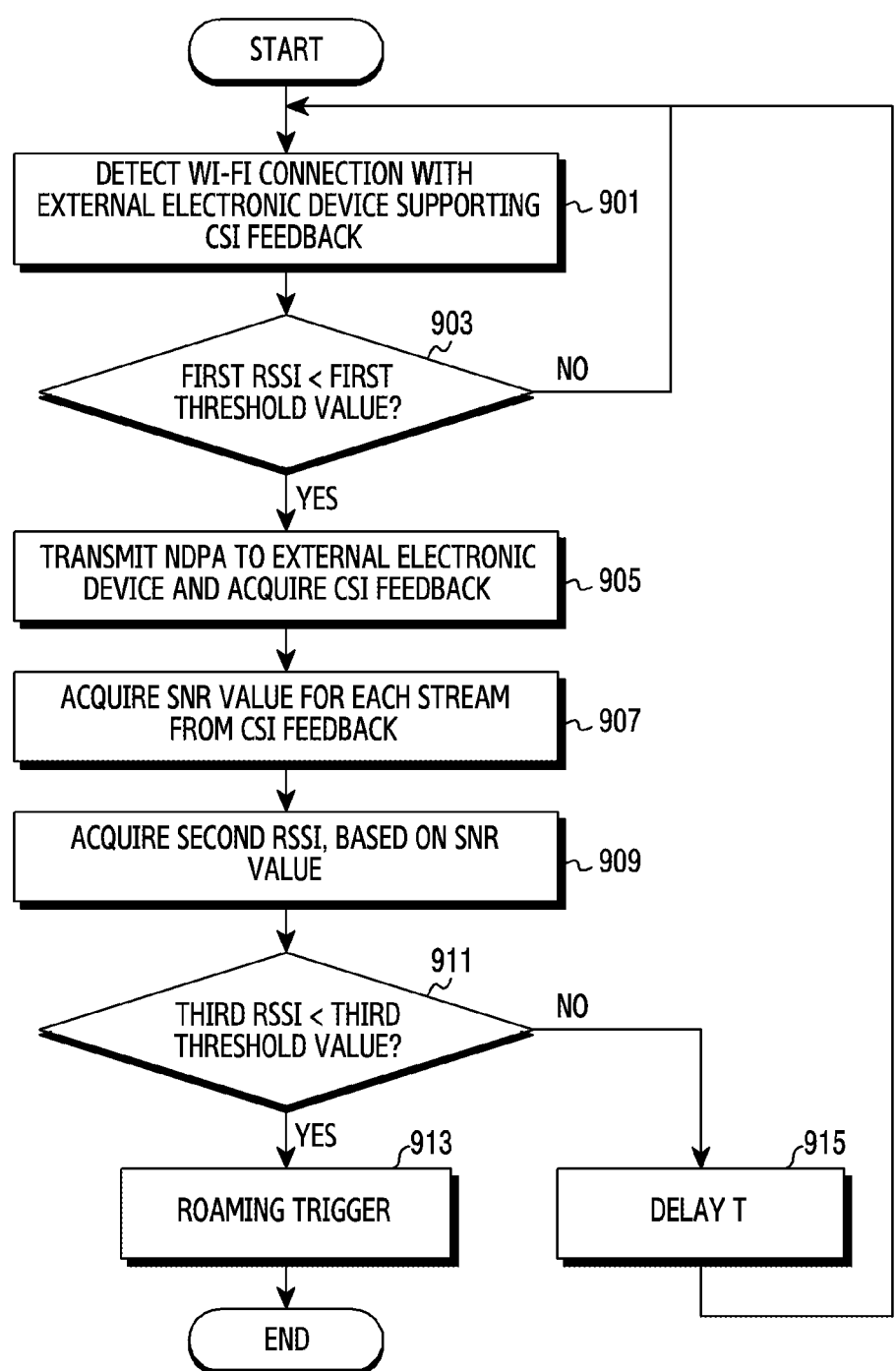
FIG. 9 is a flowchart illustrating an example operation in which the electronic device performs roaming trigger according to various embodiments.

FIG. 9 is a flowchart illustrating an example operation in which an electronic device (for example, the electronic device 101 of FIG. 1) performs a roaming trigger according to various embodiments.

Referring to FIG. 9, the electronic device 101 may acquire an SNR value for each stream based on CSI feedback received from an external electronic device (for example, the external electronic device 102 of FIG. 1) (for example, the external electronic device), acquire a second RSSI obtained by converting the strength of the signal transmitted by the electronic device into the RSSI value on the basis of the acquired SNR value, and perform roaming trigger when a third RSSI is less than a third threshold value. In an embodiment, the third RSSI may correspond to one of an average value of the first RSSI and the second RSSI, a lower value among the first RSSI and the second RSSI, or a root mean square (RMS) value of the first RSSI and the second RSSI.

According to an embodiment, the electronic device 101 may detect the Wi-Fi connection with the external electronic device 102 supporting CSI feedback in operation 901. According to an embodiment, the electronic device 101 may identify whether the external electronic device 102 is a device supporting CSI feedback in HT, VHT, or HE capabilities element during management frame exchange such as a beacon, a probe response, or an association response received from the external electronic device 102.

According to an embodiment, the electronic device 101 may determine whether the first RSSI obtained by converting the strength of the signal received by the electronic device 101 is less than the first threshold value in operation 903.

According to an embodiment, when the first RSSI is less than the first threshold value, the electronic device 101 may transmit at least one of an NDP or an NDPA to the external electronic device 102 to acquire channel state information (CSI) feedback in operation 905. In an embodiment, when the first RSSI is greater than or equal to the first threshold value, the electronic device 101 may detect the Wi-Fi connection with the external electronic device 102 supporting CSI feedback in operation 901. For example, when operation 901 is periodically performed or when a predetermined event (for example, data communication is made or movement of the electronic device 101 is performed), the electronic device 101 may perform operation 901.

According to an embodiment, the electronic device 101 may acquire an SNR value for each stream from the CSI feedback received from the external electronic device 102 in operation 907. For example, the electronic device 101 may acquire the SNR value for each of a plurality of antennas received from the external electronic device 102 through CSI feedback. When the electronic device 101 is performing communication based on MIMO, the electronic device 101 may transmit data through two or more antennas (that is, transmit two or more data streams), and the external electronic device 102 may measure the SNR value corresponding to the signal transmitted by the electronic device 101 through each antenna.

According to an embodiment, the SNR value for each stream illustrated in FIG. 9 may be understood to indicate two or more SNR values unlike FIG. 8 illustrating only one SNR value. In an example, when a multi-input multi-output (MIMO) scheme is applied to the electronic device 101 and a plurality of SNR values are measured, a minimum value or an average value of the plurality of measured SNR values may be calculated, then a value obtained by subtracting noise from the calculated minimum value or average value of the plurality of SNR values may be calculated as the second RSSI. In another example, when a single-input single-output (SISO) scheme is applied to the electronic device 101 and one SNR value is measured, a value obtained by subtracting a noise value from the SNR value may be calculated as the second RSSI.

According to an embodiment, the electronic device 101 may acquire the second RSSI based on the SNR value acquired through CSI feedback in operation 909. In an example, the electronic device 101 may identify a lower value among the first RSSI and the second RSSI as a third RSSI. In another example, the electronic device 101 may identify an average value of the first RSSI and the second RSSI as the third RSSI.

According to an embodiment, the electronic device 101 may determine whether the third RSSI is less than a third threshold value in operation 911. For example, the third threshold value may be a reference for determining a condition for changing the Wi-Fi connection to another external electronic device (for example, another AP) by the electronic device 101 due to a bad communication environment between the electronic device 101 and the external electronic device 102.

According to an embodiment, when the third RSSI is less than the third threshold value, the electronic device 101 may perform a roaming trigger in operation 913. For example, the electronic device 101 may perform an operation of discovering another external electronic device (for example, another AP). In an embodiment, when the third RSSI is greater than or equal to the third threshold value, the electronic device 101 may detect the Wi-Fi connection with the external electronic device 102 supporting CSI feedback in operation 901 after having a delay T in operation 915. Although not illustrated, according to an embodiment, when the third RSSI is greater than or equal to the third threshold value, the electronic device 101 may perform operation 905 periodically (for example, at intervals of delay T) or if a predetermined event (for example, data communication is made or movement of the electronic device 101 is performed) is detected.

According to various embodiments, when the third RSSI is greater than or equal to the third threshold value, the electronic device 101 may display an indicator related to Wi-Fi communication based on the third RSSI. For example, the number of antenna bars of the Wi-Fi icon may be based on the third RSSI.

Figure 10:
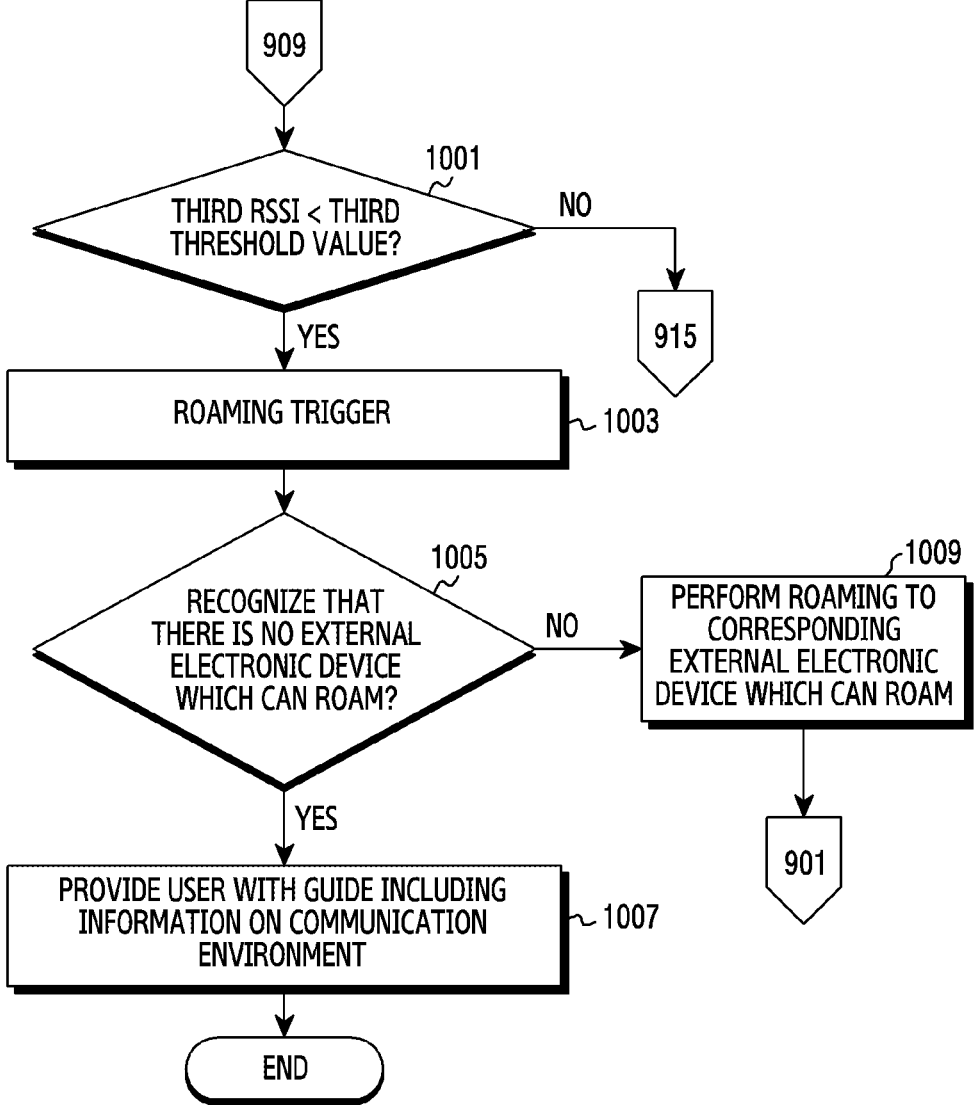
FIG. 10 is a flowchart illustrating an example operation in which the electronic device provides a guide about data transmission to a user according to various embodiments.

FIG. 10 is a flowchart illustrating an example operation in which an electronic device (for example, the electronic device 101 of FIG. 1) provides a guide for data transmission to the user according to various embodiments.

The flowchart illustrating the operation of FIG. 10 may be an operation performed after operation 909 of FIG. 9.

Referring to FIG. 10, the electronic device 101 may perform roaming trigger when the third RSSI is less than the third threshold value, and may provide the guide to the user when it is recognized that there is no external electronic device 102 which can roam.

According to an embodiment, the electronic device 101 may determine whether the third RSSI is less than a third threshold value in operation 1001.

According to an embodiment, when the third RSSI is less than the third threshold value, the electronic device 101 may perform roaming trigger in operation 1003. In an embodiment, when the third RSSI is greater than or equal to the third threshold value, the electronic device 101 may detect the Wi-Fi connection with the external electronic device 102 supporting CSI feedback in operation 901 after having a delay T in operation 915.

According to an embodiment, the electronic device 101 may recognize that there is no external electronic device 102 which can perform roaming in operation 1005. For example, when the third RSSI is less than the third threshold value, the electronic device 101 may perform roaming trigger and, as a result of the roaming trigger, may recognize that there is no other external electronic device 102 which can roam with the electronic device 101.

According to an embodiment, the electronic device 101 may provide a guide including information on a communication environment between the electronic device 101 and the external electronic device 102 to the user in operation 1007. For example, when the third RSSI is less than the third threshold value and thus roaming is needed but there is no other external electronic device which can roam, information indicating that it is difficult to perform data communication may be provided to the user. According to an embodiment, when it is difficult to perform data communication, a guide including the corresponding cause may be provided to the user. For example, the electronic device 101 may display information indicating that the strength of the signal received from the external electronic device 102 is equal to or less than a threshold value or the strength of the signal which the external electronic device 102 receives from the electronic device 101 is equal to or less than a threshold value on the display 220.

According to an embodiment, when the electronic device 101 does not recognize that there is no external electronic device 102 which can roam (that is, the electronic device recognizes that there is the external electronic device 102 which can roam) in operation 1005, the electronic device 101 may perform roaming to the corresponding external electronic device 102 which can roam in operation 1009. For example, when the electronic device 101 recognizes an AP which can roam, the electronic device 101 may perform roaming to the corresponding AP.

According to an embodiment, after performing roaming to the external electronic device 102 which can roam in operation 1009, the electronic device 101 may perform operation 901.

Figure 11:
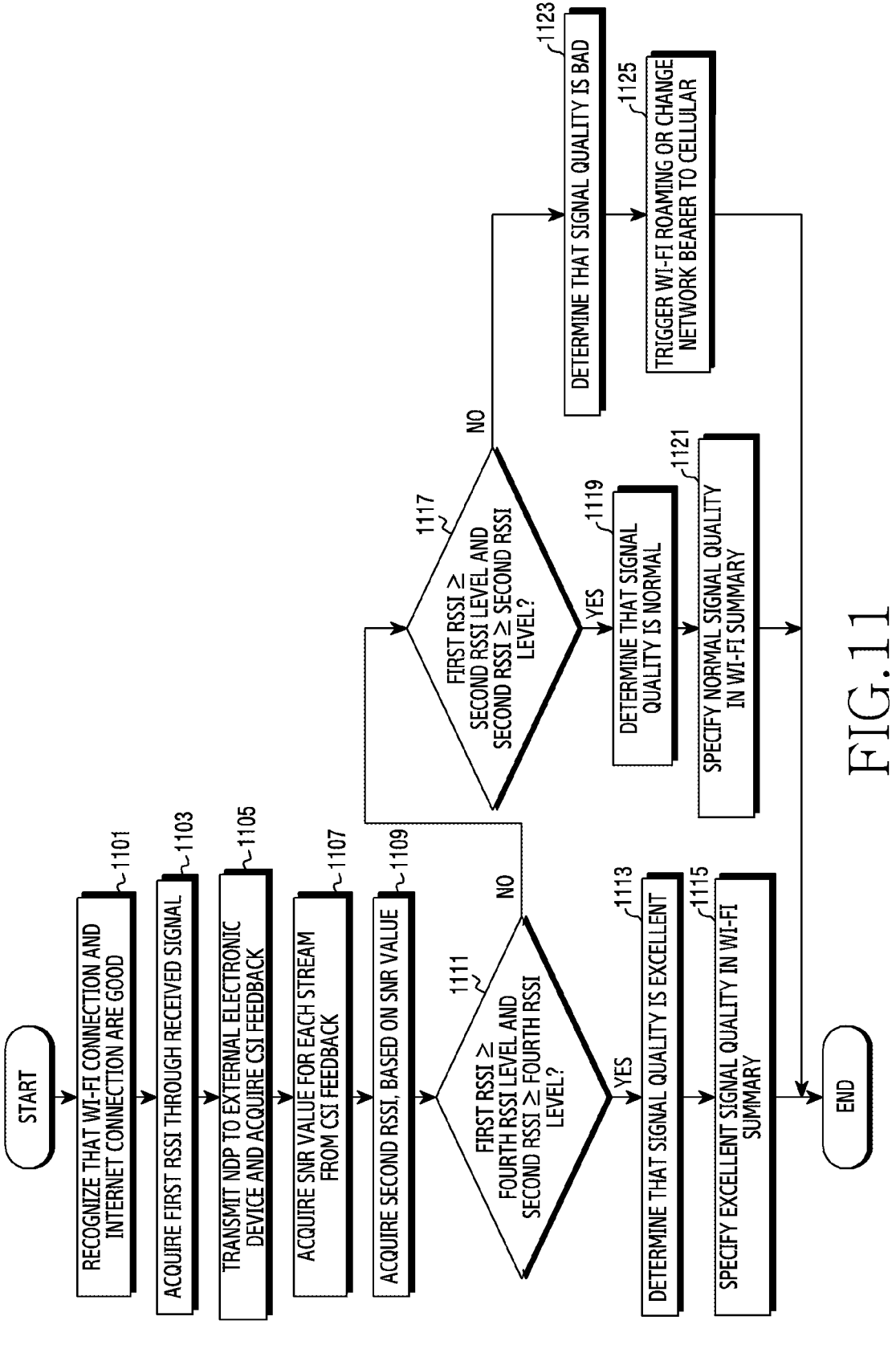
FIG. 11 is a flowchart illustrating an example operation in which the electronic device displays a Wi-Fi signal quality according to various embodiments.

FIG. 11 is a flowchart illustrating an example operation in which an electronic device (for example, the electronic device 101 of FIG. 1) displays the quality of a Wi-Fi signal according to various embodiments.

According to an embodiment, the electronic device 101 may recognize that the Wi-Fi connection and the Internet connection are good in operation 1101.

According to an embodiment, the electronic device 101 may acquire a first RSSI which is a value obtained by converting the strength of the signal received by the electronic device 101 into the RSSI through the signal received by the electronic device 101 in operation 1103.

According to an embodiment, the electronic device 101 may acquire CSI feedback by transmitting an NDP to the external electronic device 102 in operation 1105. For example, the electronic device 101 may identify whether the external electronic device 102 is a device supporting CSI feedback in HT, VHT, or HE capabilities element during management frame exchange such as a beacon, a probe response, or an association response received from the external electronic device 102, and when the external electronic device 102 is the device supporting CSI feedback, may transmit the NDP and acquire CSI feedback.

According to an embodiment, the electronic device 101 may acquire an SNR value for each stream from the CSI feedback received from the external electronic device 102 in operation 1107.

According to an embodiment, the electronic device 101 may acquire a second RSSI obtained by converting the strength of the signal which the external electronic device 102 receives from the electronic device 101 into the RSSI based on the SNR value acquired from the CSI feedback received from the external electronic device 102 in operation 1109.

The following examples may be described with reference to the RSSI value of FIG. 7.

According to an embodiment, the electronic device 101 may determine whether the first RSSI is greater than or equal to a fourth RSSI level and the second RSSI is greater than or equal to the fourth RSSI level in operation 1111. For example, the fourth RSSI may include a reference for determining that the signal received by the electronic device 101 or the external electronic device 102 is good. In an embodiment, the electronic device 101 may determine whether the first RSSI and the second RSSI are greater than a predetermined signal strength (for example, −55 dBm).

According to an embodiment, when the first RSSI and the second RSSI are greater than or equal to the fourth RSSI level, the electronic device 101 may determine that the signal quality is excellent in operation 1113.

The Wi-Fi summary described below may correspond to a UX/UI indication through which the electronic device 101 according to various embodiments provides information on a communication environment between the electronic device 101 and the external electronic device 200.

According to an embodiment, the electronic device 101 may specify that the signal quality is excellent in the Wi-Fi summary in operation 1115. In an embodiment, when the first RSSI or the second RSSI is less than the fourth RSSI level, the electronic device 101 may determine whether the first RSSI and the second RSSI is less than or equal to the second RSSI level in operation 1117.

According to an embodiment, when the first RSSI and the second RSSI are greater than or equal to the second RSSI level, the electronic device 101 may determine that the signal quality is normal in operation 1119. In an embodiment, the electronic device 101 may specify that the signal quality is normal in the Wi-Fi summary in operation 1121. In an embodiment, when the first RSSI or the second RSSI is less than the second RSSI level, the electronic device 101 may determine that the signal quality is bad in operation 1123. In an embodiment, the electronic device 101 may trigger Wi-Fi roaming or change a network bearer to cellular in operation 1125.

According to various embodiments, the electronic device 101 may display an indicator related to Wi-Fi communication of the electronic device 101 in operation 1115 or operation 1121. For example, the electronic device 101 may display the number of antenna bars of the Wi-Fi icon based on the first RSSI and/or the second RSSI.

According to an embodiment, the electronic device 101 may identify a connection state of a predetermined network (for example, Wi-Fi) with the external electronic device 102 (for example, an access point (AP)) supporting a trigger frame, when the connection state of the predetermined network with the external electronic device 102 is identified and the electronic device 101 receives a trigger frame from the external electronic device 102, identify a first RSSI indicating a received signal strength for the received trigger frame, calculate loss of a downlink link path (for example, a path of the signal which the electronic device 101 receives from the external electronic device 102) through difference between transmission power information of the external electronic device 102 included in the trigger frame and the first RSSI, estimate reception power of an uplink interval (for example, a path of the signal which the electronic device 101 transmits to the external electronic device 102) on the basis of difference between a configured transmission power value of the electronic device 101 and the calculated downlink path loss, determine the reception power value of the estimated uplink interval as the second RSSI, and display an indicator indicating the connection state of the predetermined network on the display 220 on the basis of the determined first RSSI and second RSSI. For example, the electronic device 101 may use the received signal strength for the trigger frame received from the external electronic device 102 as the first RSSI and use the estimated reception power value of the uplink interval as the second RSSI instead of the first RSSI and the second RSSI which can be acquired through the NDP/NDPA and the CSI feedback packet.

According to various embodiments, the electronic device 101 may determine whether the electronic device 101 is based on a transmission signal or a reception signal according to a used application or service in operation 1115 or operation 1121. For example, the electronic device 101 may display an indicator on the basis of the transmitted signal when the application or service used by the electronic device 101 needs transmission data much more than reception data (determine on the basis of the number of data packets or an amount of transmission of data) and display an indicator on the basis of the received signal when the application or service used by the electronic device 101 needs reception data much more than transmission data.

Figure 12A:
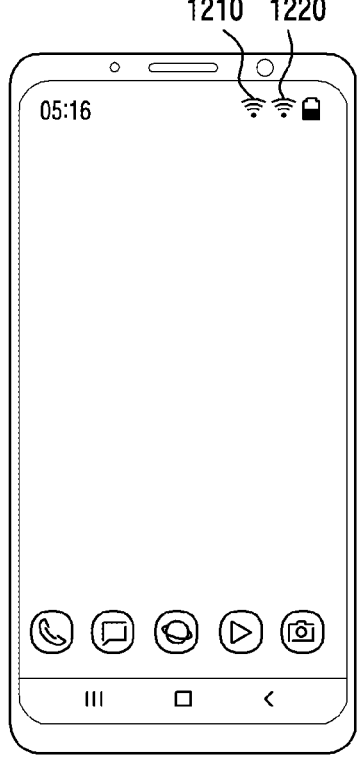
FIGS. 12A and 12B are diagrams illustrating an example UI for displaying an indicator related to Wi-Fi communication by the electronic device according to various embodiments.
Figure 12B:
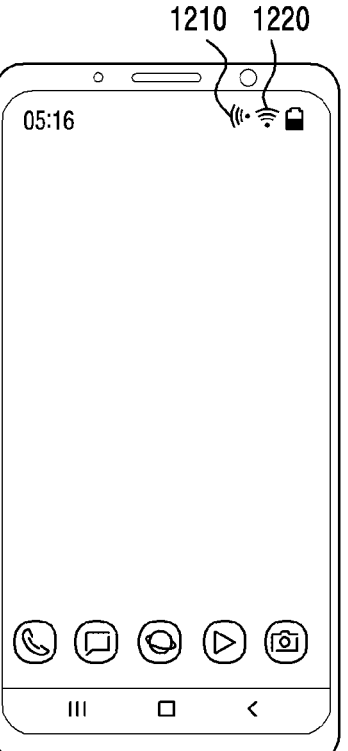

FIGS. 12A and 12B are diagrams illustrating an example UI through which the electronic device 101 displays an indicator related to Wi-Fi communication according to various embodiments.

Referring to FIGS. 12A and 12B, the electronic device 101 may display at least one indicator reflecting a Wi-Fi communication state with the external electronic device 102 through the UI.

According to an embodiment, the electronic device 101 may display a plurality of indicators related to Wi-Fi communication between the electronic device 101 and the external electronic device 102 as illustrated in FIG. 12A. For example, the electronic device 101 may simultaneously display a first indicator 1210 based on a received signal and a second indicator 1220 based on a transmitted signal. In another example, the electronic device 101 may simultaneously display the first indicator 1210 based on the received signal, the second indicator 1220 based on the transmitted signal, and a third indicator (not shown) based on a signal having a higher strength among the received signal and the transmitted signal.

According to an embodiment, when traffic of transmitted and received signals is concentrated in a predetermined direction (for example, a reception direction or a transmission direction) for a predetermined time or longer, the electronic device 101 may display the indicators 1210 and 1220 based on the corresponding direction. In an example, when traffic of transmitted and received signals is concentrated in a reception direction of the electronic device 101, the electronic device 101 may display an indicator of the reception direction in a different color or express the indicator as an image distinguished from other parts. When the direction in which the electronic device 101 receives the signal is a –x direction, the first indicator 1210 based on the received signal of the electronic device 101 may be displayed to face the –x direction as illustrated in FIG. 12B.

Figure 13:
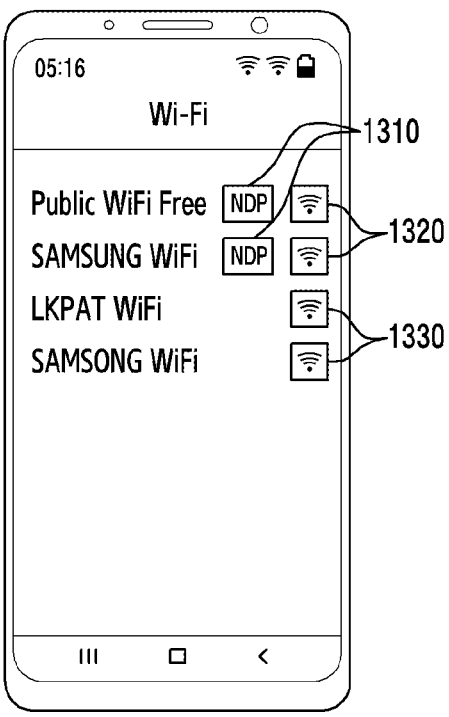
FIG. 13 is a diagram illustrating an example UI for setting Wi-Fi by the electronic device according to various embodiments.

FIG. 13 is a diagram illustrating an example UI for setting Wi-Fi by the electronic device 101 according to various embodiments.

Referring to FIG. 13, the electronic device 101 may display a configuration screen for setting a Wi-Fi communication state with the external electronic device 102 on the UI.

According to an embodiment, the electronic device 101 may display an indicator indicating a Wi-Fi state based on whether the found external electronic device 102 supports a response to an NDP in the configuration screen for setting the Wi-Fi communication state. For example, an icon and/or text indicating whether the response to the NDP is supported may be displayed or whether the response to the NDP is supported may be displayed through a color.

According to an embodiment, when the electronic device 101 searches for the external electronic device 102, the electronic device 101 may display an indicator 1310 indicating whether the found external electronic device 102 supports the response to the NDP. For example, when the found external electronic device 102 supports the response to the NDP, an indicator 1320 indicating the Wi-Fi state may be displayed through the application of an algorithm of the disclosure. In another example, when the found external electronic device 102 does not support the response to the NDP, an indicator 1330 indicating the Wi-Fi state may be displayed on the basis of a received signal. According to an embodiment, the electronic device 101 may identify whether the found external electronic device 102 supports the response to the NDP based on a connection history with the external electronic device 102. For example, when there is a connection history with the external electronic device 102, the indicator 1320 or 1330 indicating the Wi-Fi state may be displayed on the basis of whether the external electronic device 102 supports the response to the NDP. In another example, when there is no connection history with the external electronic device 102, an NDP packet may be transmitted to the external electronic device 102 in the background and it may be determined whether the external electronic device 102 supports the response to the NDP on the basis of whether CSI feedback can be acquired (or whether the external electronic device 102 transmits CSI feedback).

The electronic device according to various example embodiments may include: a display, a communication circuit, a memory including instructions, and at least one processor electrically connected to the display, the communication circuit, and the memory, wherein the at least one processor may be configured to: control the communication circuit to transmit a specified packet (for example, a null data packet (NDP)) to an external electronic device through a specified network (for example, a Wi-Fi network), receive feedback information (for example, channel state information (CSI) feedback) including a strength of a signal received from the electronic device from the external electronic device (for example, an access point (AP)) in response to transmission of the specified packet (for example, the null data packet (NDP)), determine a communication state of the specified network, based on the received feedback information, and control the display to display an indicator indicating the communication state on the display, based on the determined communication state of the specified network.

According to an example embodiment, the specified network may be a Wi-Fi network.

According to an example embodiment, the external electronic device may be an access point (AP).

According to an example embodiment, the specified packet may be at least one of a null data packet (NDP) or a null data packet announcement (NDPA).

According to an example embodiment, the feedback information includes channel state information (CSI) feedback.

According to an example embodiment, the at least one processor may be configured to: perform a roaming trigger based on a strength of a signal related to the communication state of the specified network being less than a specified value.

According to an example embodiment, the at least one processor may be configured to: recognize that there is no other external electronic device which can perform roaming trigger based on there being no other external electronic device which can perform the roaming trigger, and provide information related to a cause of non-performance of data transmission based on the data transmission between the electronic device and the external electronic device not being performed.

According to an example embodiment, the at least one processor may be configured to: provide information on the communication state based on a strength of a signal related to the communication state of the specified network being less than a specified value.

According to an example embodiment, the indicator may be a Wi-Fi antenna bar type.

According to an example embodiment, the at least one processor may be configured to: detect whether there is a connection with the external electronic device supporting channel state information (CSI) feedback through the specified network.

A method of operating an electronic device according to various example embodiments may include: transmitting a specified packet to an external electronic device through a specified network, receiving feedback information including a strength of a signal received from the electronic device from the external electronic device in response to transmission of the specified packet, determining a communication state of the specified network based on the received feedback information, and displaying an indicator indicating the communication state on the display based on the determined communication state of the specified network.

According to an example embodiment, the specified network may be a Wi-Fi network.

According to an example embodiment, the external electronic device may be an access point (AP).

According to an example embodiment, the specified packet may be at least one of a null data packet (NDP) or a null data packet announcement (NDPA).

According to an example embodiment, the feedback information is channel state information (CSI) feedback.

An electronic device according to various example embodiments may include: a display, a communication circuit, a memory including instructions, and at least one processor electrically connected to the display, the communication circuit, and the memory, and the at least one processor may be configured to: identify a Wi-Fi connection state with the external electronic device supporting channel state information (CSI) feedback based on the Wi-Fi connection state with the external electronic device being identified, identify a first RSSI indicating a strength of a signal based on the electronic device receiving the signal from the external electronic device, based on the first RSSI being less than a first threshold value, transmit a null data packet (NDP) to the external electronic device, acquire CSI feedback from the external electronic device, acquire a second RSSI, based on the acquired CSI feedback, and based on difference between the first RSSI and the second RSSI being greater than a second threshold value, display an indicator indicating the Wi-Fi connection state on the display, based on a lower value among the first RSSI or the second RSSI.

According to an example embodiment, the at least one processor may be configured to: acquire a third RSSI corresponding to a lower value among the first RSSI or the second RSSI and, based on the third RSSI being less than a third threshold value, perform a roaming trigger.

According to an example embodiment, the at least one processor may be configured to: recognize that there is no external electronic device which can perform roaming trigger based on there being no external electronic device which can perform the roaming trigger, and provide information on a cause of non-transmission of data based on data transmission between the electronic device and the external electronic device not being performed.

According to an example embodiment, the indicator may be a Wi-Fi antenna bar type.

According to an example embodiment, the at least one processor may be configured to: detect a Wi-Fi connection with the external electronic device supporting channel state information (CSI) feedback.

A method of operating an electronic device according to various example embodiments may include: receiving a specified packet (for example, a null data packet (NDP)) from the external electronic device through a specified network (for example, a Wi-Fi network), calculating reception power (for example, a first RSSI) of the specified packet and calculating path loss of a downlink interval (for example, a path of a signal which the electronic device 101 receives from the external electronic device 102) through comparison between transmission power information and reception power of the external electronic device, estimating the reception power of the external electronic device in an uplink interval (for example, a path of a signal which the electronic device 101 transmits to the external electronic device 102) of the specified network based on transmission power of the electronic device and the calculated path loss of the downlink interval, and displaying an indicator indicating a communication state on the display of the electronic device based on the estimated reception power state of the uplink interval of the specified network.

The electronic device according to various example embodiments may include: a display, a communication circuit, a memory including instructions, and at least one processor electrically connected to the display, the communication circuit, and the memory, and the at least one processor may be configured to: identify a Wi-Fi connection state with the external electronic device (for example, an access point (AP)) supporting a trigger frame, based on the Wi-Fi connection state with the external electronic device being identified and the electronic device receiving the trigger frame from the external electronic device, identify a first RSSI indicating a received signals strength for the received trigger frame, calculate path loss of a downlink interval (for example, a path of a signal which the electronic device 101 receives from the external electronic device 102) through a difference between transmission power information of the external electronic device included in the trigger frame and the first RSSI, estimate reception power of the external electronic device in an uplink interval (for example, a path of a signal which the electronic device 101 transmits to the external electronic device 102) based on a difference between a configured transmission power value of the electronic device and the calculated downlink path loss, determine the estimated reception power of the uplink interval as a second RSSI, and display an indicator indicating the Wi-Fi connection state on the display based on a lower value among the first RSSI or the second RSSI based on a difference between the first RSSI and the second RSSI being greater than a second threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments(s) described herein may be used in conjunction with any other embodiment(s) described herein.

What is claimed is:

1. An electronic device comprising:
a display;
a communication circuit;
a memory including instructions; and
at least one processor, comprising processing circuitry, electrically connected to the display, the communication circuit, and the memory,
wherein the at least one processor is configured individually and/or collectively to:
identify a connection state of a Wi-Fi network with an external electronic device;
obtain a first RSSI indicating a strength of a signal received from the external electronic device through the Wi-Fi network;
control the communication circuit to transmit a specified packet to the external electronic device through the Wi-Fi network when the first RSSI is smaller than a first threshold value;
in response to transmission of the specified packet, receive feedback information from the external electronic device, wherein the feedback information includes a second RSSI indicating a strength of a signal received from the electronic device;
compare the first RSSI to the second RSSI, based on the received feedback information; and
control the display to display an indicator indicating a communication state of the Wi-Fi network on the display, based on a smaller value between the first RSSI and the second RSSI, when a difference between the first RSSI and the second RSSI is greater than a second threshold value.

2. The electronic device of claim 1, wherein the external electronic device is an access point (AP).

3. The electronic device of claim 1, wherein the specified packet is at least one of a null data packet (NDP) or a null data packet announcement (NDPA).

4. The electronic device of claim 1, wherein the feedback information is channel state information (CSI) feedback.

5. The electronic device of claim 1, wherein the at least one processor is configured to: perform a roaming trigger based on a strength of a signal related to the communication state of the Wi-Fi network being less than a specified value.

6. The electronic device of claim 5, wherein the at least one processor is configured to:
based on there being no other external electronic device which can perform the roaming trigger, recognize that there is no other external electronic device which can perform the roaming trigger; and
based on data transmission not being performed between the electronic device and the external electronic device, provide information related to a cause of non-performance of the data transmission.

7. The electronic device of claim 1, wherein the at least one processor is configured to: provide information on the communication state based on a strength of a signal related to the communication state of the Wi-Fi network being less than a specified value.

8. The electronic device of claim 1, wherein the indicator is a Wi-Fi antenna bar type.

9. The electronic device of claim 1, wherein the at least one processor is configured to: detect whether there is a connection with the external electronic device supporting channel state information (CSI) feedback through the Wi-Fi network.

10. A method of operating an electronic device, the method comprising:

identifying a connection state of a Wi-Fi network with an external electronic device;

obtaining a first RSSI indicating a strength of a signal received from the external electronic device through the Wi-Fi network;

transmitting a specified packet to the external electronic device through the Wi-Fi network when the first RSSI is smaller than a first threshold value;

in response to transmission of the specified packet, receiving feedback information from the external electronic device, wherein the feedback information includes a second RSSI indicating a strength of a signal received from the electronic device;

comparing the first RSSI to the second RSSI, based on the received feedback information; and displaying an indicator indicating a communication state of the Wi-Fi network on a display of the electronic device, based on a smaller value between the first RSSI and the second RSSI, when a difference between the first RSSI and the second RSSI is greater than a second threshold value.

11. The method of claim 10, wherein the external electronic device is an access point (AP).

12. The method of claim 10, wherein the specified packet is at least one of a null data packet (NDP) or a null data packet announcement (NDPA).

13. The method of claim 10, wherein the feedback information is channel state information (CSI) feedback.

14. An electronic device comprising:

a display;

a communication circuit;

a memory including instructions; and at least one processor electrically connected to the display, the communication circuit, and the memory, wherein the at least one processor is configured to:

identify a Wi-Fi connection state with an external electronic device supporting channel state information (CSI) feedback;

based on the Wi-Fi connection state with the external electronic device being identified, identify a first RSSI indicating a strength of a signal based on the electronic device receiving the signal from the external electronic device;

based on the first RSSI being less than a first threshold value:

transmit a null data packet (NDP) to the external electronic device;

acquire CSI feedback from the external electronic device;

acquire a second RSSI based on the acquired CSI feedback; and based on difference between the first RSSI and the second RSSI being greater than a second threshold value, display an indicator indicating the Wi-Fi connection state on the display, based on a lower value among the first RSSI or the second RSSI.

15. The electronic device of claim 14, wherein the at least one processor is configured to:

acquire a third RSSI corresponding to a lower value among the first RSSI or the second RSSI; and based on the third RSSI being less than a third threshold value, perform a roaming trigger.

16. The electronic device of claim 15, wherein the at least one processor is configured to:

based on there being no other external electronic device which can perform the roaming trigger, recognize that there is no other external electronic device which can perform the roaming trigger; and based on data transmission not being performed between the electronic device and the external electronic device, provide information related to a cause of non-performance of the data transmission.

17. The electronic device of claim 14, wherein the indicator is a Wi-Fi antenna bar type.

18. The electronic device of claim 14, wherein the at least one processor is configured to detect a Wi-Fi connection with the external electronic device supporting the CSI feedback.

* * * * *